United States Patent [19]

Perry

[11] Patent Number: 5,170,584
[45] Date of Patent: Dec. 15, 1992

[54] SNAIL BARRIER

[76] Inventor: Michael D. Perry, 5541 Oakleaf Cir., Placerville, Calif. 95667

[21] Appl. No.: 537,708

[22] Filed: Jun. 14, 1990

[51] Int. Cl.⁵ .............................................. A01M 1/20
[52] U.S. Cl. ...................................... 43/124; 43/107; 43/121
[58] Field of Search ..................... 43/107, 121, 124; 47/32, 33, 26; 256/11, 24, 25, 65, 72

[56] References Cited

U.S. PATENT DOCUMENTS

| D. 32,432 | 4/1900 | Lewis | 43/121 |
|---|---|---|---|
| D. 227,563 | 7/1973 | Torchia . | |
| 280,291 | 6/1883 | Bunnell | 47/32 |
| 392,237 | 11/1888 | Krause . | |
| 395,678 | 1/1889 | Wiebrock . | |
| 413,507 | 10/1889 | Halstead . | |
| 1,373,817 | 4/1921 | Nelson et al. . | |
| 2,012,651 | 8/1935 | Beall | 43/124 |
| 2,087,164 | 7/1937 | Purifoy | 43/124 |
| 2,149,495 | 3/1939 | Barnard | 43/107 |
| 3,089,282 | 5/1963 | Tennison | 43/124 |
| 4,241,532 | 12/1980 | Fancy | 43/121 |
| 4,319,423 | 3/1982 | Judd . | |
| 4,566,219 | 1/1986 | Firth . | |
| 4,660,320 | 4/1987 | Baker et al. . | |
| 4,663,883 | 5/1987 | Hilliard | 47/33 |

Primary Examiner—Kurt C. Rowan
Attorney, Agent, or Firm—Bernhard Kreten

[57] ABSTRACT

A device which serves as a barrier precluding the migration of ground dwelling pests of, but not limited to the Phylum Mollusca, Class Gastropoda (snails and slugs) therebeyond. The barrier has a concavo-convex-spiraloid configuration in cross-section generally defined as an involute. The barrier has an interior which is concave and contains an upwardly disposed trough. The trough serves as a container for baits to attract and retain snails for later collection. Alternatively, the trough may also serve as a container for pesticides and pesticide-containing baits such that said baits are presented to pests with virtually no risk of access to and accidental poisoning of pets and children. The exterior of the barrier is a substantially convex configuration. The various component parts forming the barrier may be assembled using a plurality of linear and angular connectors such that the barrier can accommodate cultivated areas of varying enclosed geometric configurations.

6 Claims, 5 Drawing Sheets

SNAIL BARRIER

FIELD OF THE INVENTION

The following invention relates generally to an instrumentality to exclude or trap ground dwelling pests upon then attempted entry into enclosed, defined cultivated areas. The instrumentality can further be used as a poison bait station that is virtually risk free in regards to contamination of produce or accidental poisoning of pets and children. In addition, the device can be used as a means to trap and gather edible snails for later collection and consumption.

BACKGROUND OF THE INVENTION

The prior art contains several attempts to solve the age-old problem of protecting crops from agricultural pests.

The following patents reflect a state of the art of which applicant is aware and are included herein with the view towards discharging the applicant's acknowledged duty to disclose known, relevant prior art.

| INVENTOR | PATENT NO. | ISSUE DATE |
| --- | --- | --- |
| KRAUSE | 392,347 | November 6, 1888 |
| WIEBROCK | 395,678 | January 1, 1889 |
| HALSTEAD | 413,507 | October 22, 1889 |
| NELSON, et al. | 1,373,827 | April 5, 1921 |
| TORCHIA | D227,563 | July 3, 1973 |
| JUDD | 4,319,423 | March 16, 1982 |
| FIRTH | 4,566,219 | January 28, 1986 |
| BAKER, et al. | 4,660,320 | April 28, 1987 |

It is stipulated, however, that none of these references teach singly nor render obvious when considered in any conceivable combination the nexus of the instant invention as disclosed in greater detail hereinafter and as particularly claimed.

The patent to Nelson, et al. is interesting in that it teaches the use of a trough-like instrumentality to hold pesticides and present a toxic barrier. However, there is no provision to make less likely accidental poisoning of children and pets because its poison containing trough is exposed and therefore accessible.

A similar concept is taught in the patent to Firth. This patent shares the same infirmity of leaving the pesticide exposed and accessible.

The snail bait holder of Torchia, while providing occlusive protection from accidental poisoning, has no ability to exclude molluscs from a defined area because its structure can not readily form a barrier.

The remainder of the prior art is either lacking in means to prevent accidental poisoning or has no provision to trap and collect certain retained edible mollusc pests having human food value.

The ability to prevent accidental poisoning is of paramount importance in light of the mammalian toxicity of materials presently in use for the control of molluscs. For example, methaldehyde, a common active ingredient in baits formulated for slug and snail control, is acutely toxic to the household cat, *Felis domesticus* L.

SUMMARY AND OBJECTS OF THE INVENTION

Accordingly, the primary object of the present invention is to provide a novel and useful barrier to impede the movement of snails and slugs into cultivated areas i.e., gardens.

It is a further object of the present invention to provide a barrier as characterized above which can be used as a trap, attracting and retaining molluscs until later collection for consumption or destruction.

It is a further object of the present invention to provide a device as characterized above wherein pesticide laced baits and poisoned attractants are utilized by which pestiferous molluscs are attracted and poisoned.

Viewed from a first vantage point, it is an object of the present invention to provide a device as characterized above wherein the various component parts of the barrier may be assembled using a plurality of linear and angular connectors such that the barrier can accommodate cultivated areas of varying enclosed geometric configurations.

Viewed from yet another vantage point, it is an object of the present invention to provide a device as characterized above for safely presenting toxic material to gastropod pests that is virtually free from the risk of accidental poisoning of pets and children. The poisonous baits are placed in a trough and the trough is oriented such that it is occluded from both visual and tactile access thereby precluding access to the poisonous bait by non-target organisms, such as children and pets.

Viewed from yet another vantage point, it is an object of the present invention to provide a device as characterized above wherein a non foraminous fence is provided including the use of barrier sections forming walls which terminate the long axis of a section to prevent all migration of gastropod pests between said sections.

BRIEF DESCRIPTION OF THE DRAWING FIGURES

DESCRIPTION OF THE PREFERRED EMBODIMENTS

Figure 1:
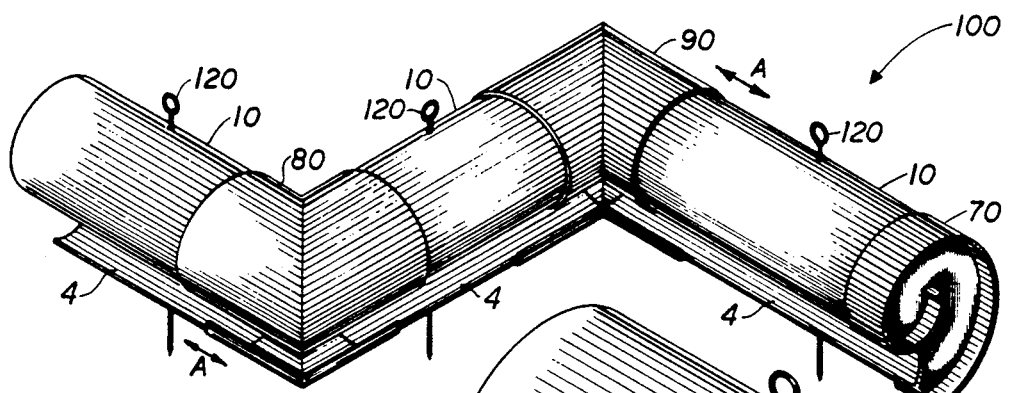
FIG. 1 is an isometric view of plural components showing connecting detail potentials.
Figure 2:
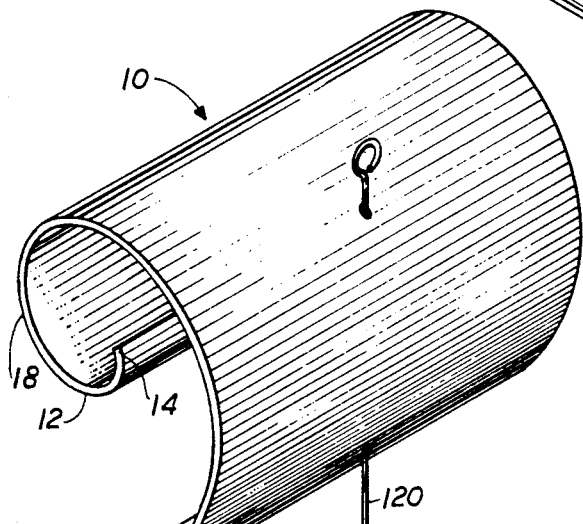
FIG. 2 is an isometric rear view of a main linear barrier section.
Figure 3:
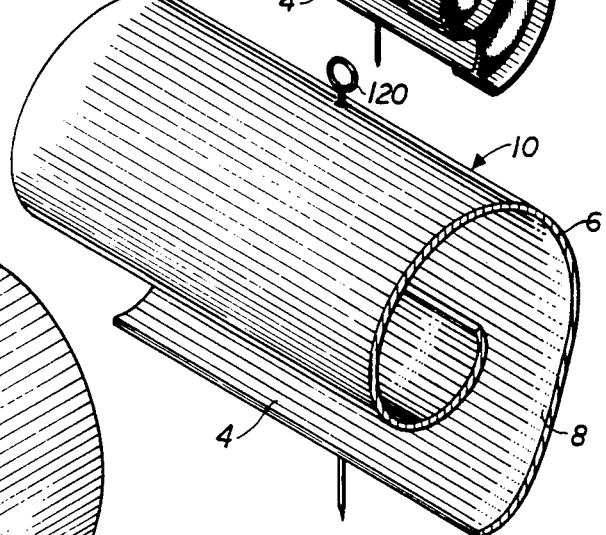
FIG. 3 is an isometric front view of the main section of FIG. 2.

Considering the drawings now wherein like reference numerals denote like parts throughout the various drawing figures, reference numeral 100 is directed to a barrier for the exclusion or trapping of ground dwelling pests including, but not limited to, Phylum Mollusca, Class Gastropoda, e.g., snails and slugs, from a defined area.

Essentially, the device consists of a barrier 100 as depicted in FIG. 1 consisting of linear open sections 10 of rigid plastic or like materials fastened together with either linear end cap connectors 70 or angled connectors 80 or 90. In section, all components defining the barrier 100 generally appear as an involute. The physical characteristics of linear sections 10 are best seen in a cross-sectional view, FIGS. 10, 12, 13 and 14.

A section 10 has an interior 9 and an exterior 11. The linear section 10 consists of a leading edge 3 running to a ramp 4 and a ceiling 6 on the interior 9. The ramp and ceiling are connected by a first concave wall 8 which links said ceiling and said ramp providing collectively an arcuate transition therebetween. A trough 12 is connected to said ceiling by a second concave wall 18 providing an arcuate transition between said wall 18 and said trough 12. A terminus 14 of said trough 12 faces vertically upwardly from the ground. The arcuate concavity thus formed from said ramp 4, said ceiling 6 and said first wall 8 faces away, from a protected cultivated garden G. Accordingly, a corresponding convexity, characterized by exterior ramp face 24, exterior first wall 28 and a portion of exterior ceiling 26 face garden G.

Figure 4:
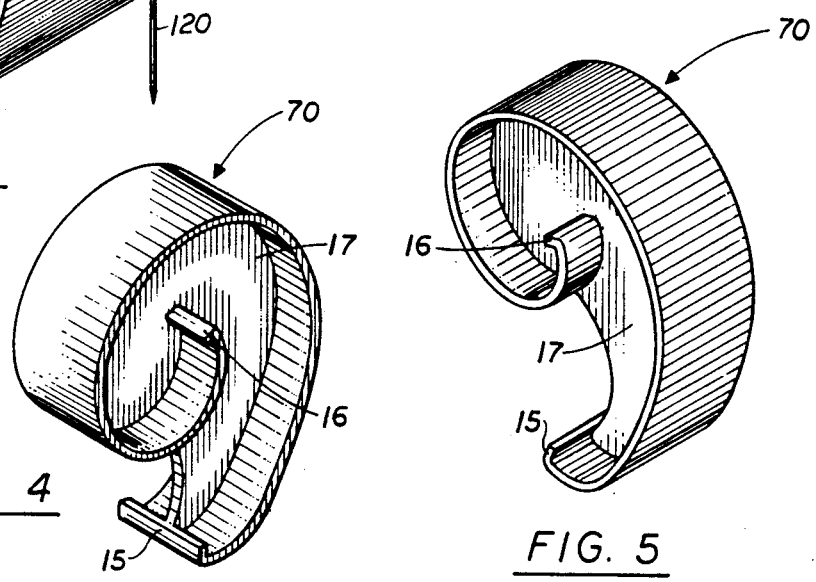
FIG. 4 is an isometric front view of an end cap.
Figure 5:
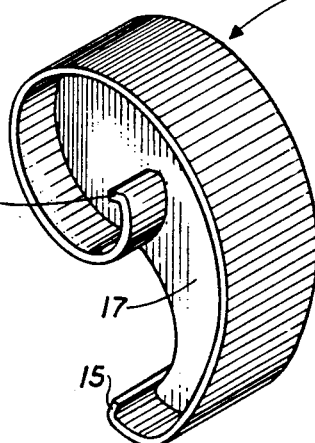
FIG. 5 is an isometric rear view of the end cap shown in FIG. 4.

Linear sections 10 are connected by means of end caps 70 shown in FIGS. 4 and 5 and corner connectors 80 and 90 shown in FIGS. 6 through 9. The end caps 70 and corner connectors 80 and 90 have cross-sectional configurations, substantially identical with the linear barrier pieces 10. Additionally, a vertical shelf 15 on the lower most leading edge 3 and a further horizontal shelf 16 on the terminus 14 of the trough 12 is depicted as in FIG. 11 to provide a locking snap-fit connection with other sections 10. The end caps 70 and connectors 80 and 90 are made from a like material to that comprising the linear sections 10 but have twice the thickness thereby imparting increased rigidity and resistance to elastic deformation. End caps include a wall 17 which is transverse to its long axis. The wall 17 stops all migration between sections.

Figure 12:
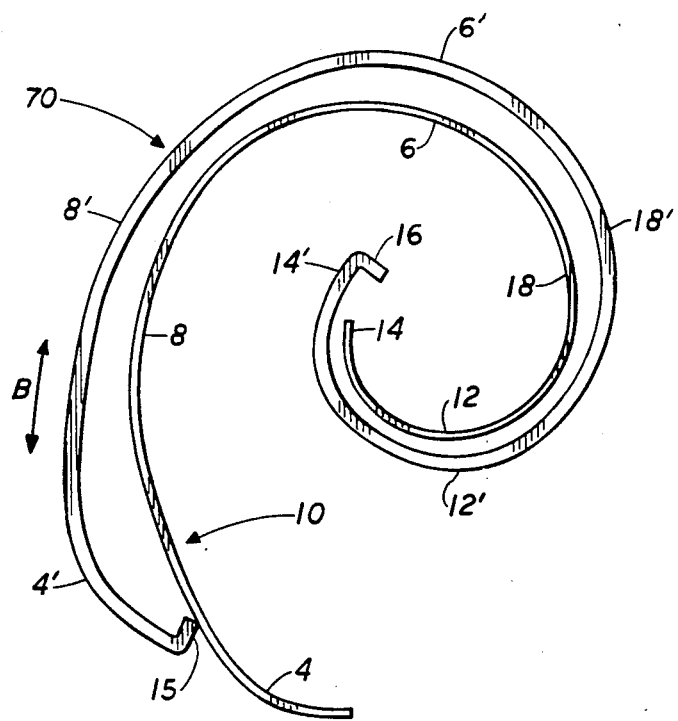
FIG. 12 is a cross-sectional view of the linear barrier section placed within the end cap or corner connector prior to connection.
Figure 13:
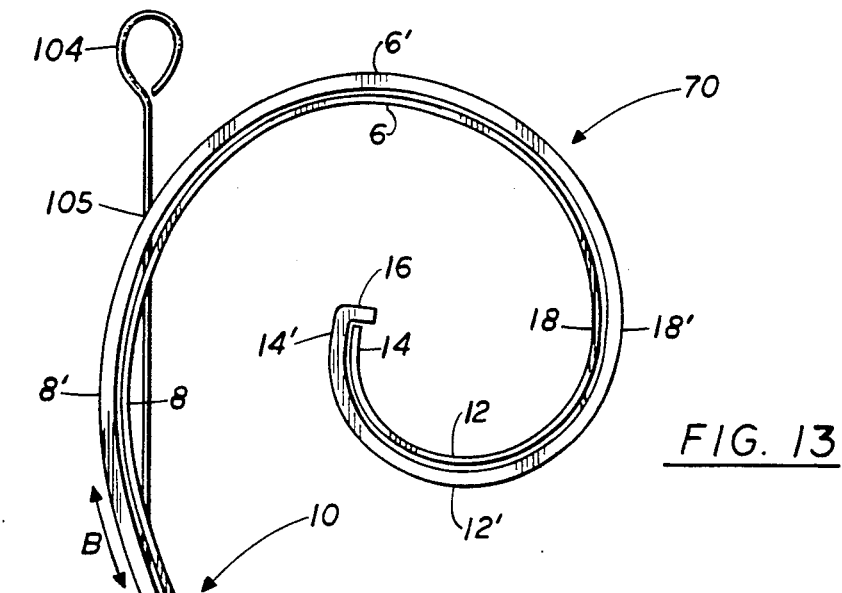
FIG. 13 is a cross-sectional view of the linear barrier section installed in the end cap or corner connector including a wire retention stake inserted therethrough.

Prime reference numerals refer to like parts on the linear end caps 70 or angled connectors 80 and 90 which are analogous to like parts in the linear sections 10. FIG. 12 depicts a linear section 10 oriented proximately to a linear end cap 70 just prior to fastening with the locking snap-fit connection. FIG. 13 depicts the linear section 10 fully installed within the linear end cap 70. FIG. 13 depicts the leading edge 4 of linear barrier section 10 and its trailing edge terminus 14 of the trough 12 fit respectively into the lower shelf 15 of the cap 70 or connector 80 or 90 and its upper shelf 16. In this manner, various sections and connectors can be locked together to create a custom barrier for a particular area under cultivation. The actual linking together of the various components involve first: axial translation of the two components as shown in FIG. 1 along the arrow "A". Next rotation of the two components along the arrow "B" of FIGS. 12 and 13 causes the leading edge 3 and terminus 14 of section 10 to respectively nest within the shelves 15 and 16 for reliable connection.

In addition to providing means for assembling various sections to create a custom barrier, said linear end caps 70, and said corner connectors 80 and 90, can be easily removed to provide a means to wash out collected snails with a garden hose.

Figure 6:
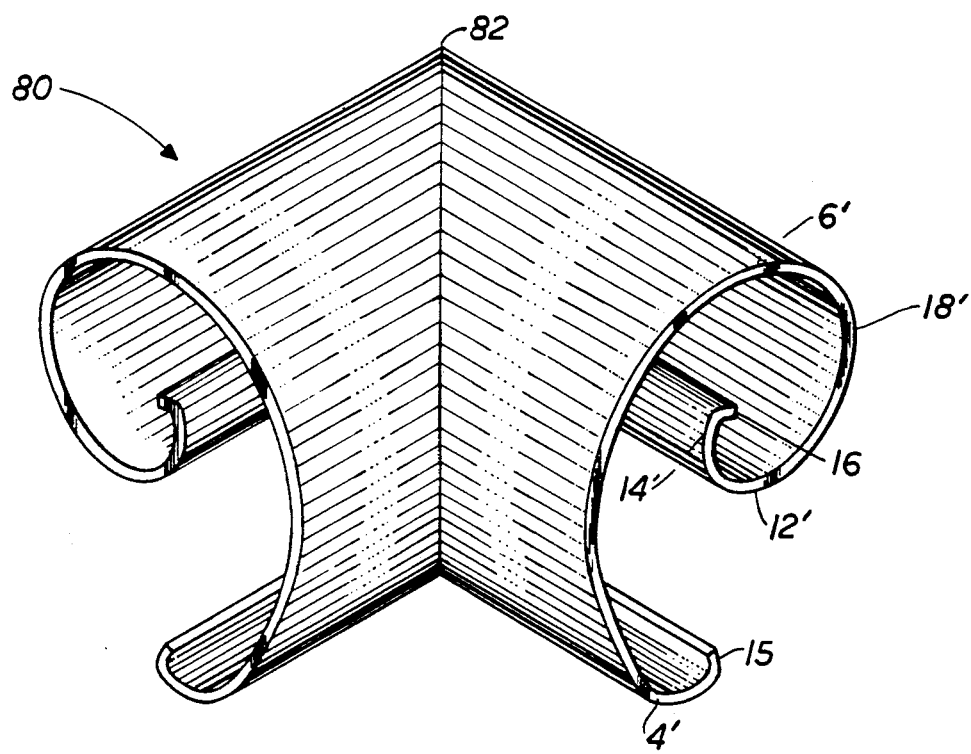
FIG. 6 is an isometric rear view of an outside corner.
Figure 7:
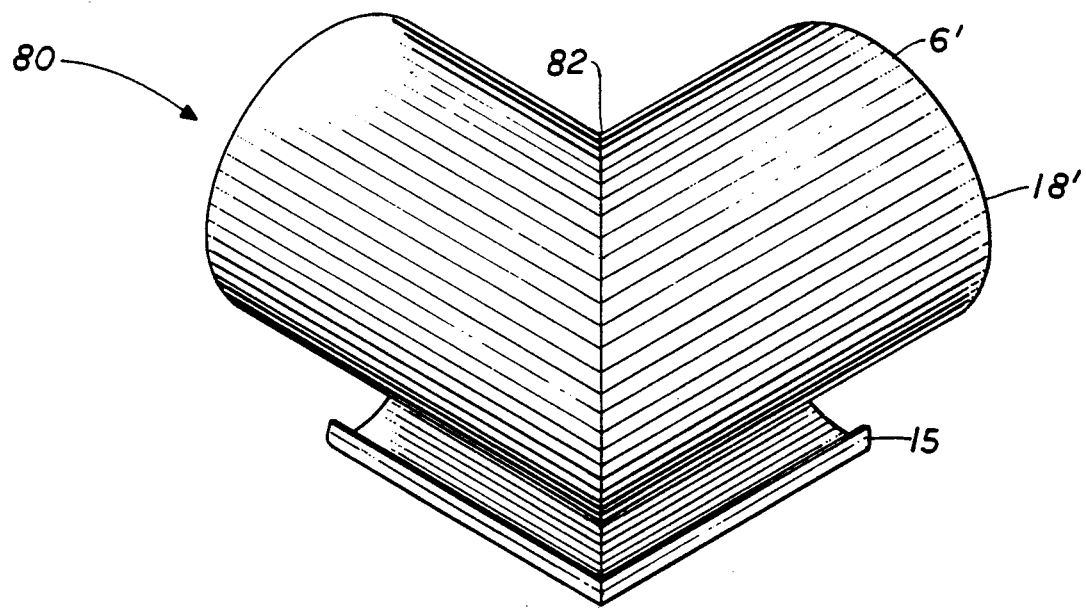
FIG. 7 is an isometric front view of the outside corner shown in FIG. 6.
Figure 11:
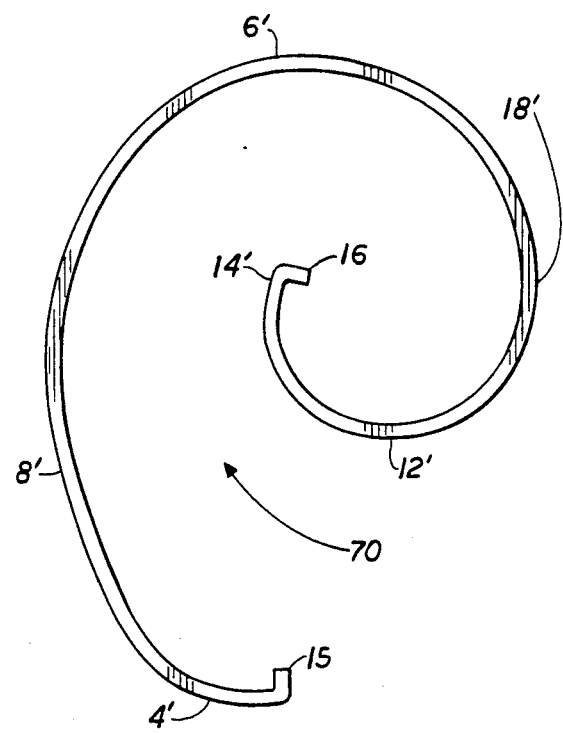
FIG. 11 is a cross-sectional schematic view of either an end cap or corner connector.

The first angled connector 80, FIGS. 6 and 7, is comprised essentially of two linear sections having the cross-sectional configuration depicted in FIG. 11. Connector 80 faces "outwardly" toward the periphery of the enclosed garden G. By "outwardly" it is meant that the ramp 4 is oriented to receive the pests and the garden is on a side remote from the ramp. Its sections are mitered together at a 90° angle 82, on the interior of the barrier, thereby providing a means to contour the barrier as suggested in FIG. 1.

Figure 8:
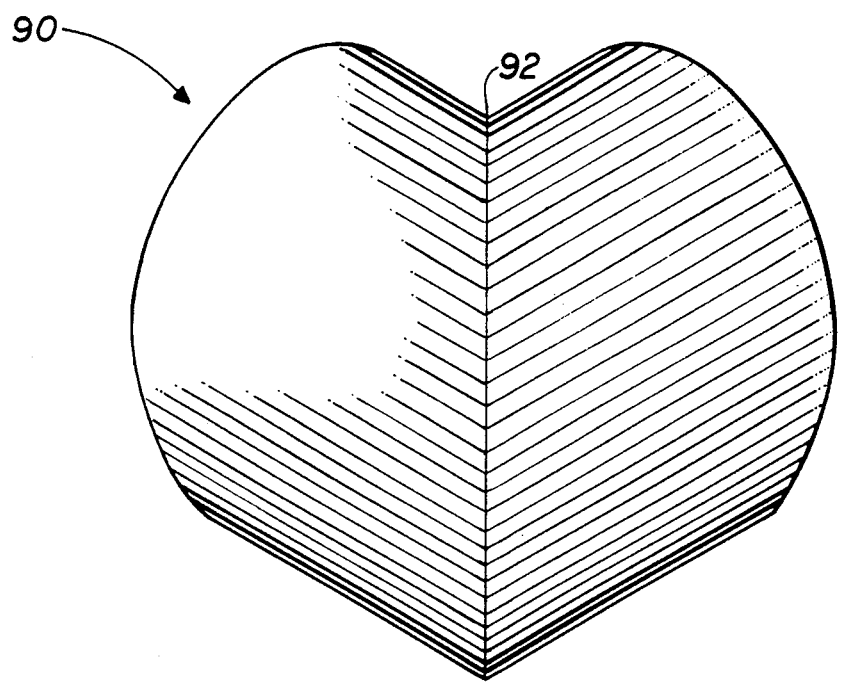
FIG. 8 is an isometric rear view of an inside corner.
Figure 9:
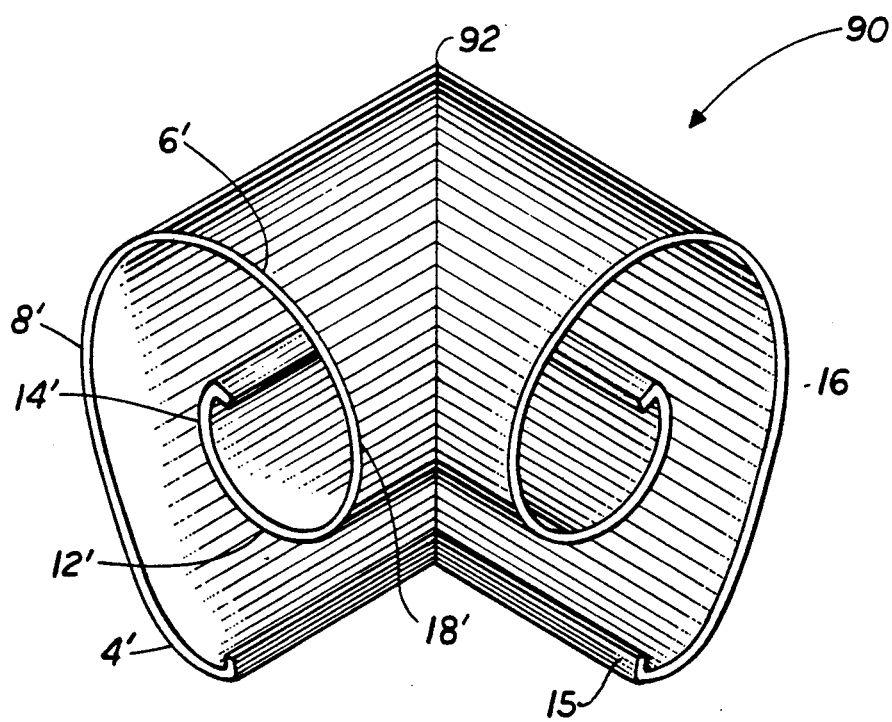
FIG. 9 is an isometric front view of the inside corner shown in FIG. 8.
Figure 10:
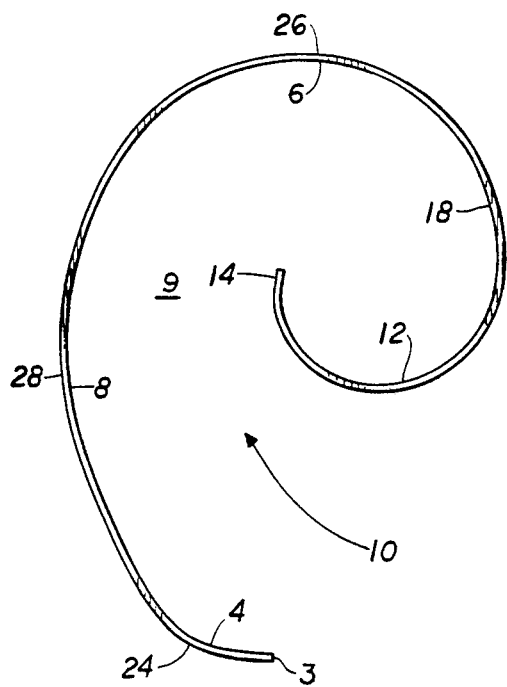
FIG. 10 is a cross-sectional schematic view of the linear barrier section of FIGS. 2 and 3.

Similarly the second angled connector 90, FIGS. 8 and 9, is comprised of two sections having the cross-sectional configuration depicted in FIG. 11 also facing "outwardly" toward the periphery of the enclosed garden G. The sections are mitered together at a 90° angle 92, on the exterior of the barrier, thereby providing a means to contour the barrier as suggested in FIG. 1.

Figure 14:
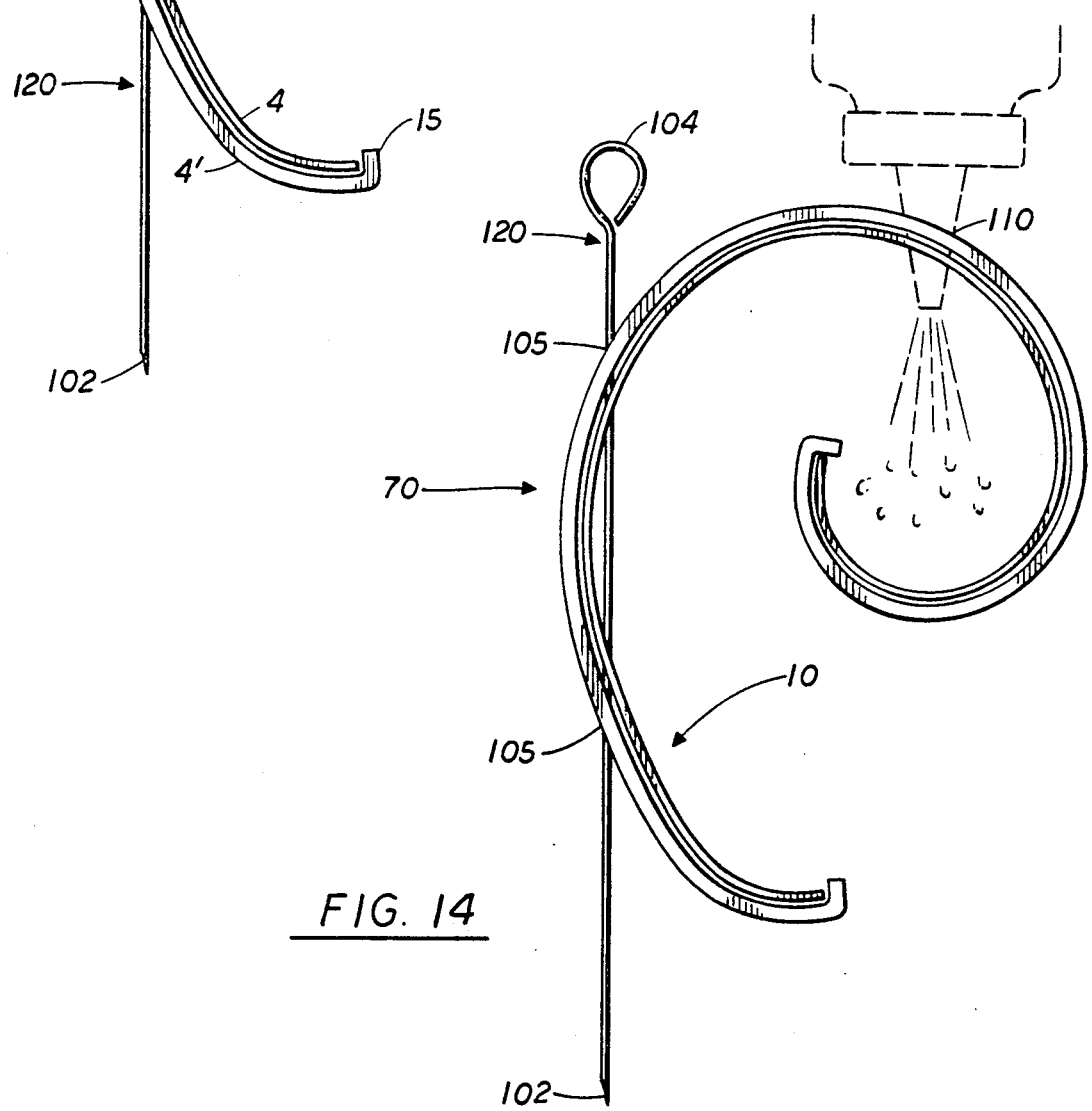
FIG. 14 is a cross-sectional view as in FIG. 13 depicting the placement of an attractant or pesticide through a hole in at least one of the components.

Linear sections 10, cap 70 and connectors 80 and 90 are affixed to the ground by means of a plurality of connecting pins 120, depicted in FIGS. 13 and 14, which consist of the appropriate gauge galvanized wire with a sharpened point 102 at one end and a loop 104 at the other end for ease of handling and insertion into a substrate such as the ground. The pins 120 pass through upper and lower holes 105 of the barrier 100.

A plurality of apertures 110 are interspaced along the linear sections 10 to provide a means for introducing molluscicides, baits, attractants or repellants as depicted in FIG. 14.

In use and operation, sections 10, end cap connectors 70 and corner connectors 80 and 90 are appropriately laid out to circumscribe the garden area G to be protected. All are interconnected to provide a barrier to ground dwelling snails.

From an outer periphery of the protected garden area only the ramp 4 is exposed because any attractant or poison is safely obscured from access by placement in the trough 12 via apertures 110. Periodically, snails may be flushed from the trough.

It has been observed that snails are unlikely to traverse beyond the trailing edge terminus 14. Presumably, the outer contour of the trough 12 provides the disincentive. The exterior generated when configuring the barrier 100 as an involute appears to preclude the necessary snail inversion to pass beyond.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A non foraminous fence comprising, in combination:
   linear barrier sections,
   angled barrier sections,
   end cap barrier sections,
   all said sections oriented to enclose a cultivated area with means to connect adjacent said sections,
   a pin for holding the fence in a fixed position, and a ramp for each section facing externally toward non-cultivated areas outside the enclosure, wherein said angled barrier section for connecting said linear barrier sections is an obtuse angle, wherein said end cap barrier sections terminate any said barrier sections by providing a wall transverse to the long axis of a section to prevent all migration between sections, including snap-fit locking means between adjacent said sections such that axial translation followed by rotation locks adjacent sections in place.

2. The fence of claim 1 wherein said locking means includes first and second shelves, said first shelf oriented to lock with a leading edge of a section.

3. The fence of claim 2 wherein said second shelf abuts against a section trough, said trough located at a central involute portion having means to preclude pest migration.

4. A non foraminous fence comprising, in combination:
- linear barrier sections,
- angled barrier sections,
- end cap barrier sections,
- all said sections oriented to enclose a cultivated area with means to connect adjacent said sections,
- a pin for holding the fence in a fixed position,
- a ramp for each section facing externally toward non-cultivated areas outside the enclosure, and
- including snap-fit locking means between adjacent said sections such that axial translation followed by rotation locks adjacent sections in place.

5. A barrier for precluding gastropod migration comprising in combination:
- a ramp,
- a ceiling,
- a first wall between said ramp and said ceiling providing collectively an arcuate transition therebetween,
- a trough,
- a second wall interposed between said ceiling and said trough such that first and second walls are contoured opposite,
- and a means to thwart gastropod migration operatively associated with said trough, and
- wherein said barrier is dividable into a plurality of discrete sections of different shapes which are interconnectable in different ways through a snap-fit locking means between adjacent said sections such that axial translation followed by rotation locks adjacent sections in place.

6. A method for controlling gastropod infestation by preventing migration to cultivated areas, the steps including:
- determining metes and bounds of areas to be protected,
- forming a barrier substantially in the shape of an involute in section having a portion shielding a trough thereby providing access to the trough only to target gastropods thereby precluding access by non-target organisms, such as children and pets,
- orienting the barrier around the periphery of said area forming a continuum,
- dividing the barrier into a plurality of discrete sections of different shapes including linear sections and angled sections, and
- connecting the separate sections of the barrier together utilizing a snap-fit locking means between adjacent said sections such that axial translation followed by rotation locks adjacent sections in place.

* * * * *